Figure 1:
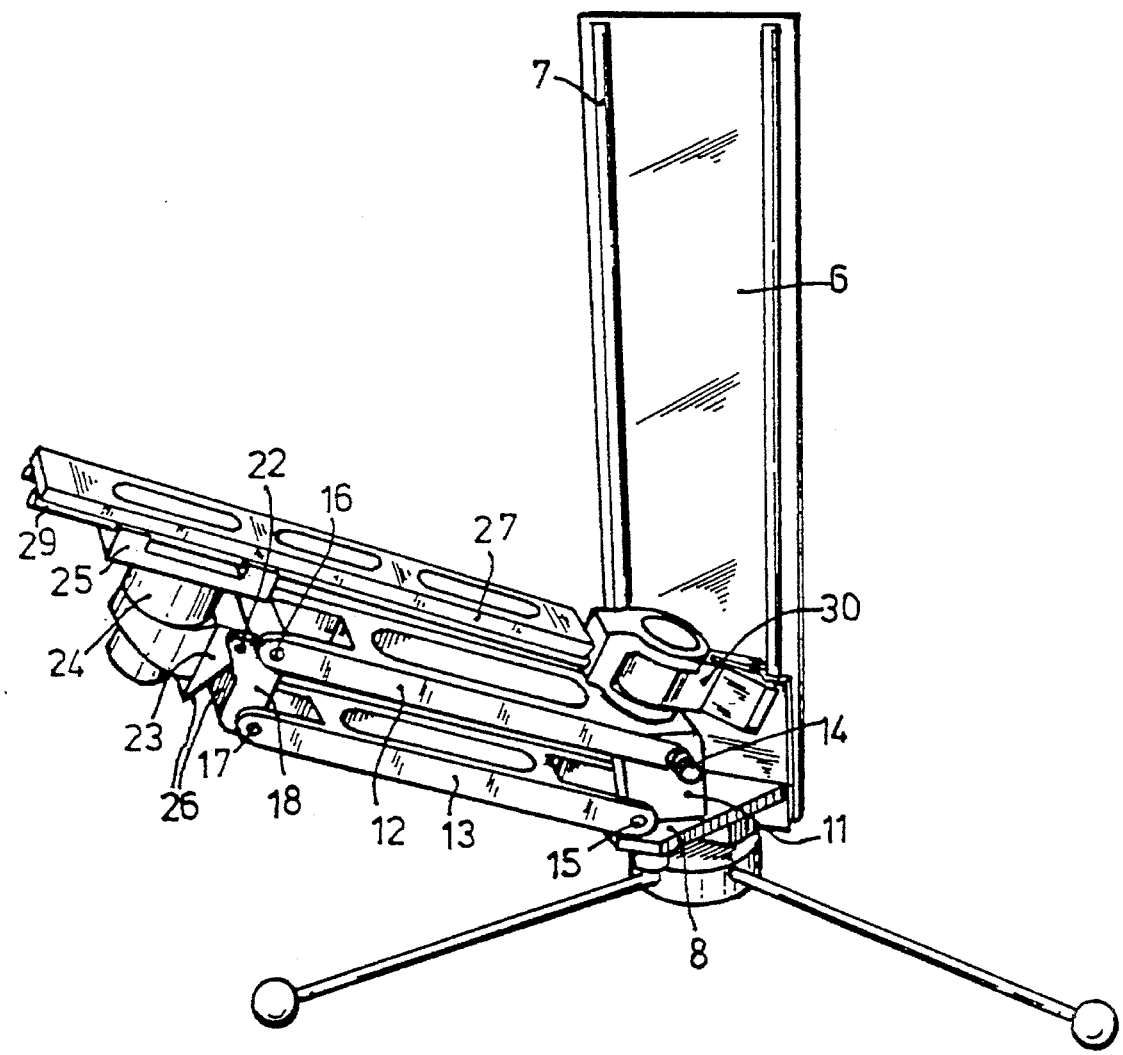

United States Patent [19]
Vermaat

[11] Patent Number: 5,467,813
[45] Date of Patent: Nov. 21, 1995

[54] ROBOT WITH SUCTION CUP ATTACHMENT TO STEAM GENERATOR PARTITION

[75] Inventor: Huibrecht P. Vermaat, Rockanje, Netherlands

[73] Assignee: Vermaat Technics B.V., Rockanje, Netherlands

[21] Appl. No.: 122,452

[22] PCT Filed: Mar. 27, 1992

[86] PCT No.: PCT/NL92/00060

§ 371 Date: Dec. 29, 1993

§ 102(e) Date: Dec. 29, 1993

[87] PCT Pub. No.: WO92/17734

PCT Pub. Date: Oct. 15, 1992

[30] Foreign Application Priority Data

Mar. 27, 1991 [NL] Netherlands ............................ 9100543

[51] Int. Cl.⁶ .................................. B25J 5/00; F22B 37/00
[52] U.S. Cl. ........................ 165/11.2; 165/76; 414/744.3; 414/744.5; 414/744.6; 414/744.7; 901/15; 901/44; 376/260
[58] Field of Search .................................. 165/11.1, 11.2, 165/76, 95; 414/744, 786, 744.3, 744.5, 744.6, 744.7; 901/15, 44; 376/260

[56] References Cited

U.S. PATENT DOCUMENTS

H1,115  12/1992  Nachbar ................................. 165/11.1
4,283,615  8/1981  Vrillon ...................................... 165/76
4,393,920  7/1983  Shima et al. ........................... 165/11.2
4,438,805  3/1984  Gugel .................................... 165/11.2
4,438,805  3/1984  Gugel .................................... 165/76
4,576,546  3/1986  Copper .
4,674,915  6/1987  Shatto .
4,920,994  5/1990  Nachbar ................................. 165/95
5,109,915  5/1992  Osusko .................................. 165/11.2
5,164,151  11/1992  Shah ...................................... 165/11.2
5,165,470  11/1992  Maekawa ............................... 165/76
5,247,251  9/1993  Yost ....................................... 165/11.1
5,355,063  10/1994  Boone .................................... 165/11.2

FOREIGN PATENT DOCUMENTS 2607421  6/1988  France .
8801431  2/1990  Netherlands .

Primary Examiner—John K. Ford
Attorney, Agent, or Firm—Ladas & Parry

[57] ABSTRACT

A robot for carrying out operations in, for example, a chamber of a heat exchanger being divided into two compartments by means of a partition can be attached to said partition by means of suction cups. An accurate vertical movement of the shoulder joint necessitates the application of either two hinges or a double hinge between the robot itself and the suction cups.

8 Claims, 3 Drawing Sheets

3,467,813

ROBOT WITH SUCTION CUP ATTACHMENT TO STEAM GENERATOR PARTITION

The invention relates to a robot that is particularly, yet not exclusively, suitable for being hoisted into one of the chambers of a heat exchanger being separated from one another by a partition, in order to carry out inspection and repair work.

Dutch Patent Application 88 01431 is one of the documents disclosing a robot for carrying out operations in a heat exchanger, comprising a supporting means including two guide shafts along which a table is reciprocable, a shoulder joint arranged on the table to rotate a mounting head about a vertical axis, a forearm being pivotably connected to the mounting head and having an elbow joint at its other extremity which supports an upper table along which an upper arm is reciprocable, said upper arm being capable of carrying inspection or reparation tools at one of its extremities, and driving means for the lower table, the mounting head, the lower arm, the elbow joint, and the upper arm.

One feature of the known robots of this type is that the supporting means comprises i.a. a pair of pins that are to be fixed into the tube plate of the heat exchanger. As a result, neither of the tubes occupied by said pins can be examined in a simple manner, for example, by using a television camera, as is usual.

The invention aims to provide a solution to this problem. To this end, the supporting means according to the invention comprises a table plate including guide shafts for the lower table, and a base plate onto which suction cups are applied to attach the robot to a wall, the partition of a heat exchanger in particular.

The table plate and the base plate are preferably connected to one another by means of a double hinge, so as to enable an accurate positioning of the table plate in the planes parallel and perpendicular to the tubes of the heat exchanger.

The forearm may consist of two parallel parallelogram arms which are, at their ends facing away from the mounting head, linked together in a pivotable manner, about coupling pins, by means of a coupling arm which is pivoted about a horizontal pivot pin to a supporting plate of the elbow joint. Preferably, the stop surfaces of the coupling arm are orientated in such a manner that the upper arm is in horizontal position when in operation. The stop surfaces may be of a cranked design.

The upper arm and/or the wrist joint may be provided with means for securing the upper arm in hoisting position either onto one of the parallelogram arms and/or the mounting head.

Figure 2:
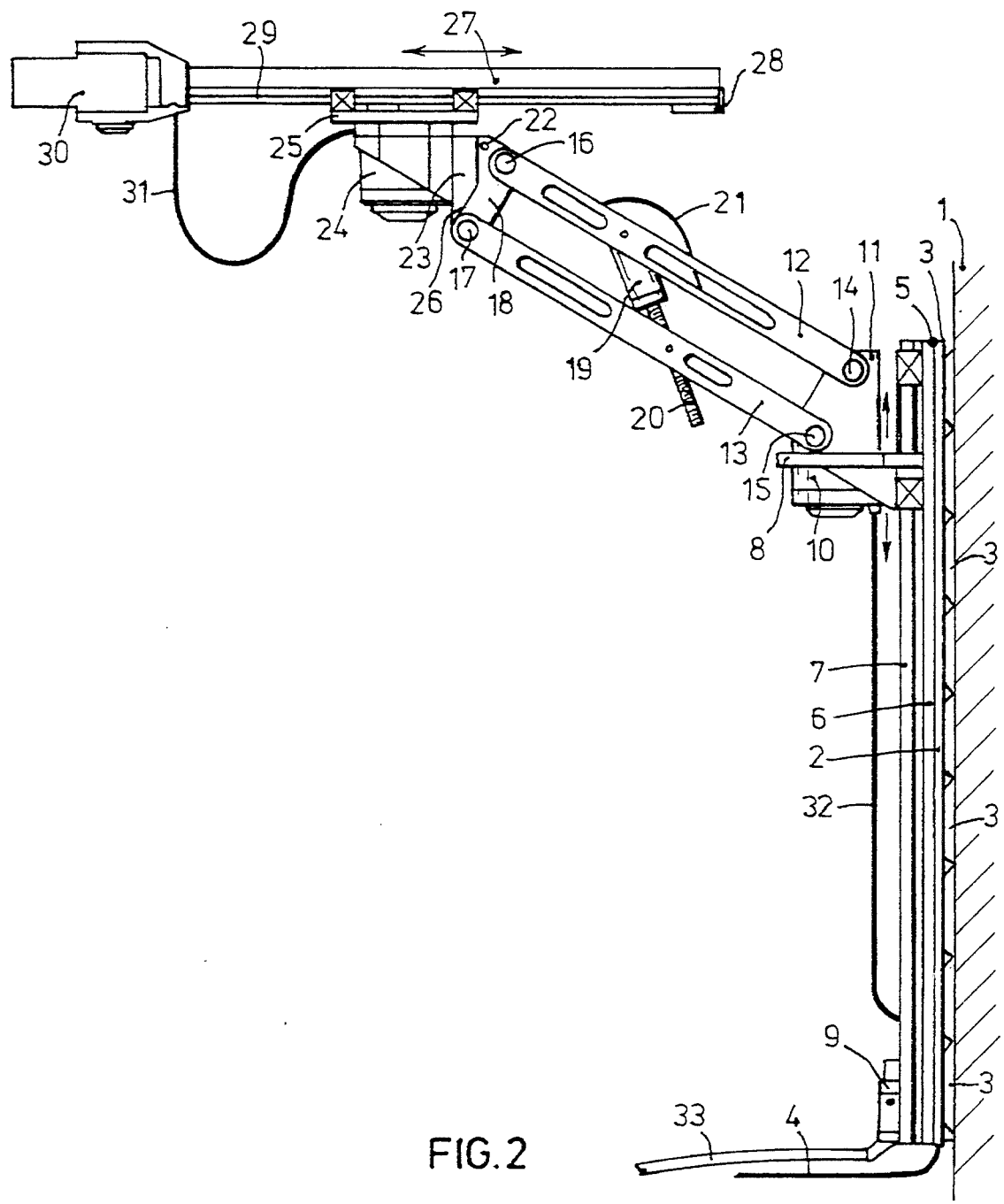
Figures 3, 4:
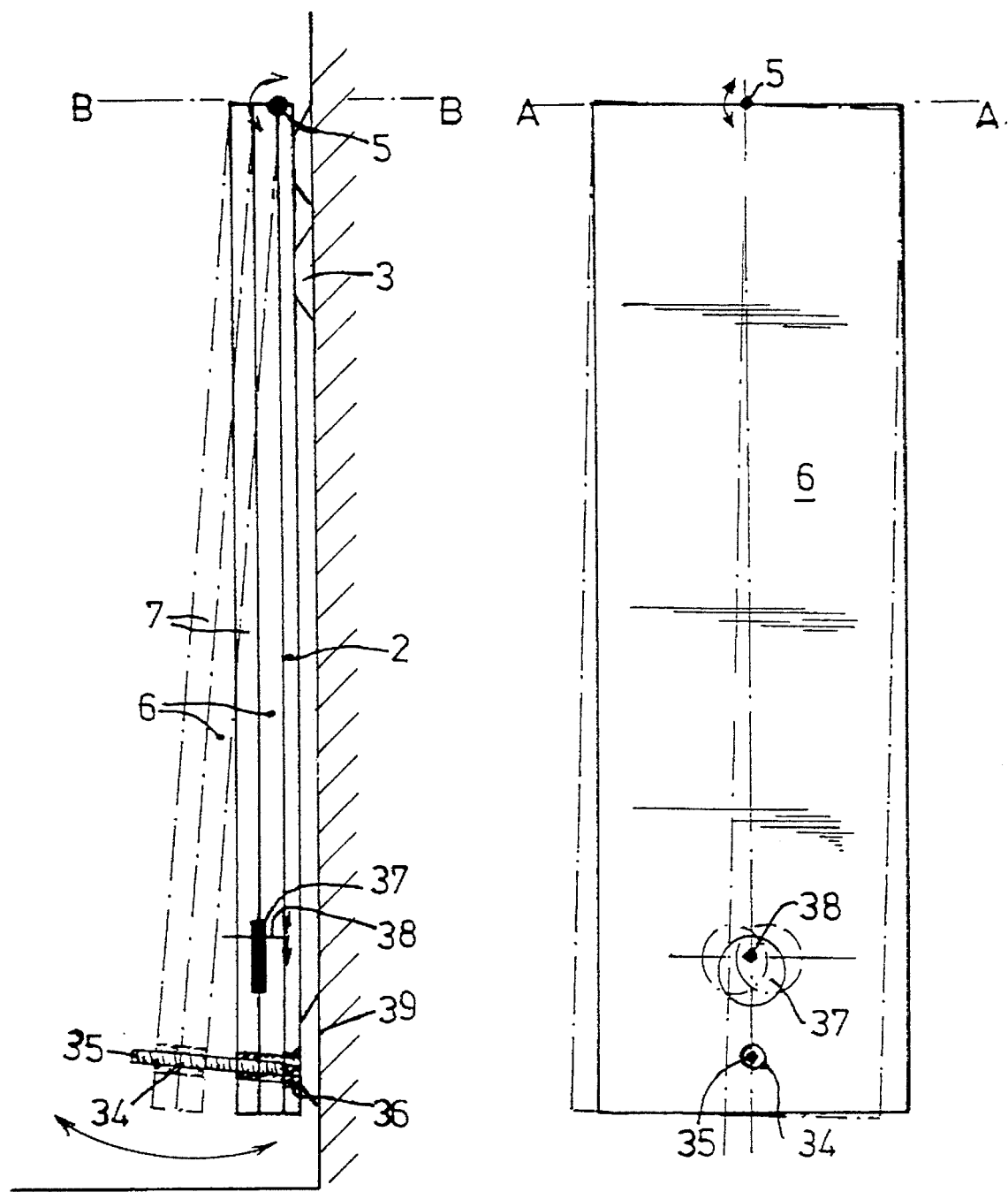

The invention will be discussed below in more detail with reference to the drawings showing, by way of example, an embodiment of a robot according to the invention. In the drawings:

FIG. 1 shows a perspective view of a model of the robot with the lower table in the lowest position and the upper arm being folded down on the forearm, FIG. 2 shows a schematic side view of the robot with the lower table in the highest position and the upper arm in horizontal position, FIG. 3 shows a schematic view of a possible way of setting the position of the table plate in relation to that of the base plate in the plane of the drawing of FIG. 2 and in a direction perpendicular to either plate, and FIG. 4 shows a schematic view of a possible way of setting the position of the table plate in relation to that of the base plate in a plane that is substantially parallel to either plate.

As FIG. 1 is based on a demonstration model, it shows two out of three legs serving to support the model on a table.

When comparing FIGS. 1 and 2, one notices that some passages of the elongated members 12 and 13 extend just between other surface pairs. These passages are provided primarily for reasons of saving weight, and therefore, their exact arrangement is of minor importance. Besides, member 6 may be provided with passages as well for the very same reason.

The invented robot is particularly suitable for being used in one of the chambers of a non-depicted heat exchanger, the chambers being separated by a partition 1. This partition 1 has a surface which is shown in FIG. 2 as being smooth and straight, though this may be different in actual practice. The robot comprises a base plate 2 having, on its surface facing the partition 1, two vertical rows (one of which is represented in the drawing) of a variable number of suction cups 3 which are connected to a vacuum pipe 4. If the surface of the partition 1 is uneven in formation, the shape of the base plate 2 is conformed to it. The base plate 2 is connected to a table plate 6 by means of a double hinge 5. The double hinge or universal (so-called 'cardan') hinge 5 can be operated by means of two (non-depicted) controllable motors, one for each hinge movement, so as to be set to the required position. The hinges of the double hinge 5 enable a hinge movement about two mutually perpendicular, horizontal axes. In this way the table plate can be levelled and positioned as well as maintained in planes exactly parallel and perpendicular to the partition 1 and the tube plate.

FIGS. 3 and 4 show a schematic view of a possible way of setting the position of table plate 6 in relation to that of base plate 2 in a vertical plane perpendicular to the base plate 2, in case the base plate is positioned substantially upright. For this purpose, the table plate 6 is provided with a passage 34 being provided with an inner thread and extending through said table plate 6. The base plate 2 is provided with a threaded spindle 35, the extremity 36 of which is accomodated in a non-threaded sleeve 39 so as to be rotatable about its longitudinal axis, said non-threaded sleeve 39 being pivoted into the base plate 2, thus enabling the threaded spindle 36 to conform to the orientation of the passage 34. By providing means which are not depicted for reasons of clarity, such as a motor serving the purpose which engages the other extremity of the spindle 36, so as to impart rotary motion to it, as well as operating means for said motor, the spindle 36 is rotated about its longitudinal axis, whereby the position of the passage 34 on the spindle 35 is changed, and the table plate 6 is rotated around the fixed point of rotating, constituted by hinge 5, about an axis A—A perpendicular to the plane of the drawing, thus being relatively inclined in relation to the base plate 2.

The front side of table plate 6, that is the side of the table plate 6 facing away from the base plate 2, includes a thin, circular rotary disc 37 provided with an eccentrically positioned hole into which a pen 38 projects which is pivotably and slidably, in a reciprocable manner, as viewed in the plane of the drawing of FIG. 3, mounted to the base plate 2.

By providing means which are not depicted for reasons of clarity, such as a suitable so-called 'pancake' motor, and operation means pertaining to it, the edge of the disc 37 can be engaged, so as to impart a rotary movement to disc 37 about the pin 38. Due to the eccentric bearing of the disc 37 on pin 38 the table plate 6 will be forced to rotate at the fixed point of rotation 5, constituted by hinge 5, about axis B—B, thus being relatively inclined in relation to base plate 2.

The table plate 6 supports two guide shafts 7 along which a lower table 8 is movable up and down by means of a threaded spindle being arranged between the axes 7 and driven by a motor 9. Onto the lower side of the lower table 8 a shoulder joint 10 is applied which is capable of rotating about a vertical axis in co-operation with a mounting head 11 arranged on the upper side of the lower table 8.

The mounting head 11 supports a forearm constituted by two parallelogram arms 12, 13 with the aid of pins 14, 15. At their ends facing away from the mounting head 11, these parallelogram arms 12, 13 are linked together in a pivotable manner, about pins 16, 17, by means of a coupling arm 18.

Between the parallelogram arms 12 and 13 a motor 19 including threaded spindle 20 is arranged, so as to impart an up-and-down motion to the arms 12, 13. The motor is fed through a feed cable 21.

The coupling arm 18 has an enlarged upper part for accomodating a hinge pin 22 for a supporting plate 23 of an elbow joint 24 that is arranged below an upper table 25. The stop surfaces 26 are orientated in such a manner that the upper table 25 and—as a result—an upper arm 27 supported slidably on it, are positioned horizontally. The stop surfaces 26 as shown in FIG. 2 are of a cranked design. The drive of the upper arm 27 comprises a motor 28 including a threaded spindle which is arranged between the two guide shafts 29.

On the upper arm 27, at the end facing away from the motor 28, a wrist joint 30 has been arranged, onto which the (non-depicted) inspection and repair tools may be applied. The wrist joint 30 includes a motor that is fed by a feed cable 31. Additional feed cables are schematically indicated by reference numerals 32 and 33.

Along with the lower table 8 the parts 11–32 may be folded in the former's lower position in such a manner that the entire robot has mere dimensions of circa 110×25×25 cm. Such a robot is relatively simply to be hoisted through a manhole of a heat exchanger, provided that in one of the holes of the tube plate a hoisting eye has been temporarily arranged.

The scope of the claims also include other embodiments than the one represented in the drawings.

I claim:

1. A robot particularly suitable for being hoisted into one of the chambers of a heat exchanger steam generator, said chambers being separated from one another by a partition, so as to carry out inspection and repair operations, comprising a supporting means including guide means along which a first table is reciprocal, a shoulder joint arranged on the table to rotate a mounting head for a robot arm assembly about a vertical axis, as well as driving means for said first table, said mounting head, and said robot arm assembly, said supporting means comprises a table plate (6) on which said guide means (7) for said first table (8) are provided and a base plate (2) onto which suction cups (3) are applied to secure the robot to the partition (1) of the heat exchanger.

2. A robot according to claim 1, wherein the table plate (6) and the base plate (2) are connected to each other by means of a double hinge (5), in order to enable an accurate positioning of the table plate (6) in the planes parallel and perpendicular to the partition (1) and tube plate of the heat exchanger.

3. A robot according to claim 1, wherein the robot arm assembly comprises a forearm (12, 13) being pivotably connected to the mounting head (11) and having an elbow joint at its other extremity which supports a second table (25) along which an upper arm (27) is reciprocable, said upper arm being provided with a wrist joint (30) at one of its extremities including means for carrying tools.

4. A robot according to claim 3, wherein the forearm comprises two parallel parallelogram arms (12, 13) which are, at their ends (11) facing away from the mounting head, linked together in a pivotable manner, about coupling pins, (16, 17), by means of a coupling arm (18) which is pivoted on a horizontal pivot pin (22) to a supporting plate (23) of the elbow joint (24).

5. A robot according to claim 4, wherein the orientation of the stop surfaces (26) of the coupling arm (18) and the supporting plate (23) is such that the upper arm (27) is in horizontal position.

6. A robot according to claim 5, wherein the stop surfaces (6) are of a cranked design.

7. A robot according to claim 3, wherein either the upper arm (27) or the wrist joint (30) is provided with means for locking the upper arm in hoisting position either on one of the parallelogram arms (12) or the mounting head (11).

8. A robot according to claim 1 wherein said guide means comprises guide shafts.

\* \* \* \* \*